Figure 1:
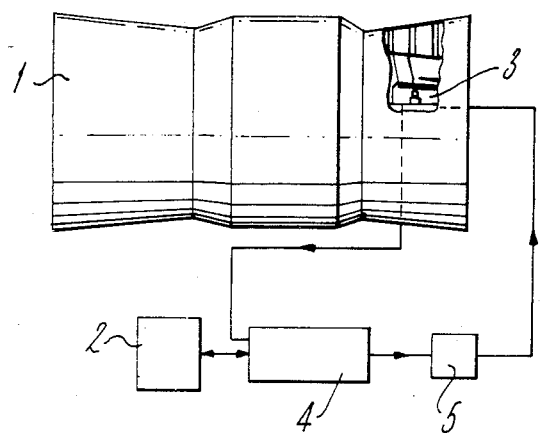

United States Patent [19]

Smith

[11] Patent Number: 4,576,001
[45] Date of Patent: Mar. 18, 1986

[54] GAS TURBINE ENGINE OIL SYSTEMS

[75] Inventor: Stanley Smith, Gloucestershire, England

[73] Assignee: Rolls-Royce Limited, London, England

[21] Appl. No.: 573,312

[22] Filed: Jan. 24, 1984

[30] Foreign Application Priority Data

Feb. 11, 1983 [GB] United Kingdom ................. 8303903

[51] Int. Cl.[4] ........................... F02C 7/06; F02G 3/00
[52] U.S. Cl. ..................... 60/39.08; 55/182; 55/184; 55/203; 210/168; 210/258
[58] Field of Search ............... 210/258, 168; 60/39.08; 55/182, 203, 184, 199, 204, 205

[56] References Cited

U.S. PATENT DOCUMENTS

| | | | |
|---|---|---|---|
| 2,922,375 | 1/1960 | Edwards | 55/199 |
| 3,248,880 | 10/1964 | Hull, Jr. et al. | 60/39.08 |
| 3,274,756 | 9/1966 | Stern | 55/199 |
| 3,290,864 | 12/1966 | Harker et al. | 55/203 |
| 3,398,526 | 8/1968 | Olah | 60/39.08 |
| 3,514,943 | 6/1970 | Britt | 60/39.08 |
| 3,520,632 | 7/1970 | Brunkhardt et al. | 60/39.08 |
| 3,528,241 | 9/1970 | Venable et al. | 60/39.08 |
| 3,712,766 | 1/1973 | Jones | 60/39.08 |
| 3,722,212 | 3/1973 | Stein | 60/39.08 |
| 3,779,345 | 12/1973 | Barnes et al. | 60/39.08 |
| 3,934,952 | 1/1976 | Gardner | 389/286 |
| 4,142,608 | 3/1979 | Sarle | 60/39.08 |
| 4,153,141 | 5/1979 | Methlie | 60/39.08 |
| 4,170,457 | 10/1979 | Tetro | 55/182 |
| 4,271,928 | 6/1981 | Northern | 60/39.08 |
| 4,344,506 | 8/1982 | Smith | 184/6.11 |
| 4,422,821 | 12/1983 | Smith | 415/89 |

FOREIGN PATENT DOCUMENTS

| | | | |
|---|---|---|---|
| 641217 | 5/1962 | Canada | 60/39.08 |
| 644592 | 10/1950 | United Kingdom | 60/39.08 |
| 677490 | 8/1952 | United Kingdom . | |
| 749684 | 5/1956 | United Kingdom | 60/39.08 |
| 800601 | 8/1958 | United Kingdom | 60/39.08 |
| 883646 | 12/1961 | United Kingdom | 60/39.08 |
| 1508212 | 4/1978 | United Kingdom . | |
| 2043799 | 10/1980 | United Kingdom . | |
| 2071510 | 9/1981 | United Kingdom . | |
| 2084266 | 4/1982 | United Kingdom . | |

*Primary Examiner*—Barry S. Richman
*Assistant Examiner*—Titus B. Ledbetter, Jr.
*Attorney, Agent, or Firm*—Parkhurst & Oliff

[57] ABSTRACT

A gas turbine engine oil system is provided in which the centrifugal separator is arranged to act as a pump for supplying bearing chambers directly, and the scavenging of the bearing chambers is achieved primarily by the pressurization air which flows into the chambers to prevent oil leakage. To avoid the use of pressure regulating valves for controlling the oil flow an oil tank is pressurized and communicates with an auxiliary outlet from the separator, the pressure in which is governed by the quantity of oil flowing around the system. The tank and the bearing chambers are fluidly connected to the centrifugal separator in two separate fluid circuits with each circuit having the separator as an element thereof.

8 Claims, 3 Drawing Figures

U.S. Patent  Mar. 18, 1986  4,576,001

GAS TURBINE ENGINE OIL SYSTEMS

The present invention relates to gas turbine engine oil systems.

In conventional oil systems the main oil pump picks up oil from the oil tank and directs it to the bearing chambers, scavenge pumps remove it from the bearing chambers and direct it to an air/oil separator, also known as the breather, in a chamber which is at low pressure and from which the separated air is vented to atmosphere. From the breather chamber the oil is pumped back to the tank usually via filters and coolers. Each pumping operation adds heat to the oil.

It has been proposed in our U.K. patent application No. 2,071,510 that the centrifugal separator can also be used as an oil pump. From our U.K. patent application No. 2,043,799 it is known that by directing the pressurised air from the engine bearing chambers to the separator, the air carries the oil with it to the separator and the scavenge pumps can be eliminated, allowing the separator to direct the oil back to the oil tank.

Also in conventional oil systems, in which the main oil pump takes its supply from the tank, special arrangements have to be made to ensure that the bearings are supplied with oil when the aircraft makes aerobatic manoeuvres and, for example, the oil tank becomes inverted uncovering the pump inlet. These special arrangements have involved the use of auxiliary pumps, or modifications to the oil tank or other parts of the system, all of which add complications to the system.

One object of the present invention is to provide a fully aerobatic oil system with a minimum amount of complication.

Another object of the present invention is to provide an oil system for a gas turbine engine which reduces the number of gear pumps required, and which can operate using a single centrifugal pump in all aerobatic conditions.

Another object of the present invention is to provide an oil system for a gas turbine engine in which there are no valves.

According to the present invention a gas turbine engine oil system comprises a tank, a centrifugal separator, and scavenge means for removing oil from the bearing chambers and directing it to the centrifugal separator, characterised in that the tank is pressurised to a first pressure by air from the engine, conduit means are provided for conveying oil from the interior of the tank to the interior of the centrifugal separator, oil circulating means are provided for directing at least a portion of the oil passing through the separator to the engine bearing chambers under centrifugal action and at a pressure greater than said first pressure, and means are provided for directing excess oil not used by the oil circulating means, and at a pressure higher than the first pressure, back to the tank.

By this means it can be seen that as long as oil is returned to the centrifugal separator from the bearing chambers, this oil will be continuously circulated, and should the oil supply pressure fall below the pressure in the tank, indicating an interruption to the oil supply, the tank will automatically supply oil to the separator due to the pressure difference.

The oil circulating means preferably comprises a static scoop within a compartment of the rotating separator which picks up spinning oil from the wall of the compartment and directs it to the bearing chambers.

Also in a preferred embodiment of the invention each bearing chamber has a plurality of scavenge openings at different locations to ensure that oil is removed from the bearing chambers whatever attitude they adopt during aerobatic manoeuvres.

In a further preferred embodiment the oil tank is provided with a vent at a location on the opposite side of the tank to the conduit means, and which is also arranged to communicate with the interior of the centrifugal separator, to provide an alternative oil supply for aerobatic manoeuvres.

Figure 2:
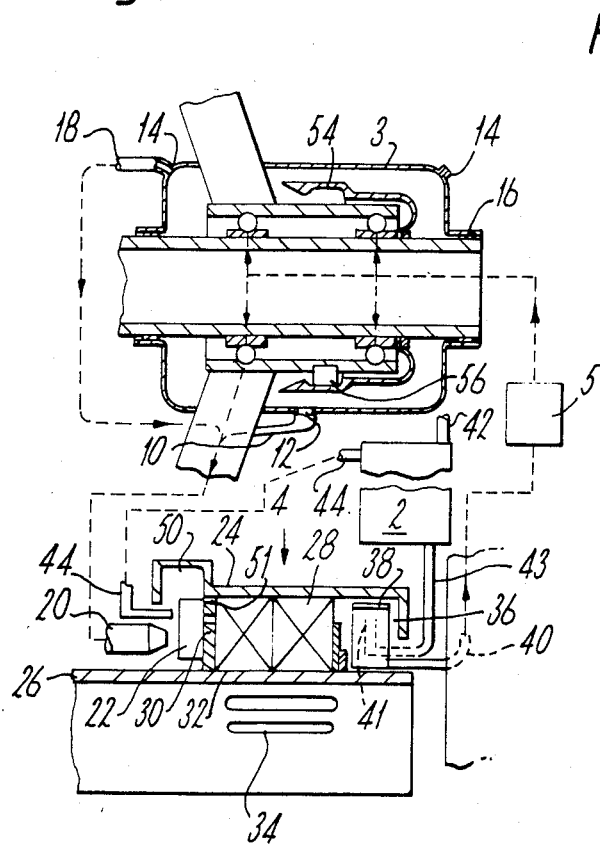
Figure 3:
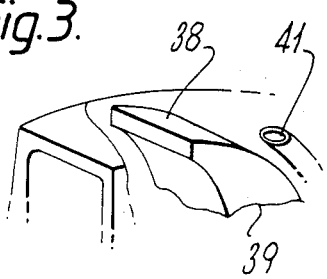

The invention will now be more particularly described with reference to the accompanying drawings in which:

FIG. 1 is a diagrammatic layout of the essential elements of the oil system of the present invention, FIG. 2 is an enlarged view of a part of the system shown in FIG. 1, and, FIG. 3 shows a detail of the arrangement of scoops shown in FIG. 2.

Referring now to the drawings a gas turbine engine 1 has an oil system which includes a tank 2, bearing chambers 3, only one of which is illustrated, a centrifugal separator 4, which also acts as a pump, and an oil cooler 5. The bearing chamber 3 is scavenged by means which includes ducting 10 having a main inlet 12 and a plurality of auxiliary inlets 14 which communicate with the interior of the chamber at a plurality of locations so that at least one will be supplied with oil whatever the attitude of the engine in flight. Air under pressure is supplied to the bearing chamber from outside the chamber via noncontacting seals 16, the air serving not only to prevent leakage of oil from the chamber through the seals, but also to provide a pressurised flow to blow the oil from the chamber into the scavenge ducting 10. The ducting communicating with the bearing chamber via inlets 14, includes a restriction 18 to prevent excessive air flows from the bearing chamber 3 when no oil is passing through the inlets.

The scavenge ducting conveys the air-oil mixture from the bearing chambers to the inlet of the centrifugal separator where it is ejected through nozzles 20 at high velocity to impinge on vanes 22, on the separator, in a direction such as to assist in driving the separator.

The separator itself consists of a main body 24 which is connected to a driving shaft 26 for rotation, and includes within it one or more compartments 28 each containing a rigid porous material, for example, the material sold under the trade name Retimet (Regd. Trade Mark) by Dunlop Limited.

A suitable separator is described in our U.K. Pat. No. 1,508,212 so that it is not described in detail. It suffices to say that the air-oil mixture after impinging on the vanes 22 enters the separator through an inlet aperture 30 and passes into the pores of the porous material which causes it to be rotated so that the oil is urged radially outwardly. The air, being less dense, passes through an air outlet 32 in a radially inner region, and escapes from the separator via one or more apertures 34 in the driving shaft. From there the air is vented from the engine.

The oil on the other hand, is now spinning with the radially outer wall of the separator and the only way out is from a compartment 36 at the opposite end of the separator in which is mounted a static scoop 38. The scoop extends radially outwardly to a radius at which the centrifugal pressure on the liquid together with its rotational velocity enables the required pressure to be developed in the oil in the scoop, and the inlet area of the scoop is sized to allow the scoop to collect sufficient flow for the bearings at that pressure. From the scoop 38 the oil passes via a diffuser 39 to the main oil supply ducting 40 leading to the bearing chambers. The diffuser 39 converts the velocity of the oil entering the scoop to pressure. Any oil in excess of that taken by the scoop will spill into a second outlet 41, which may be a simple pipe, or a second scoop, FIG. 3, and is passed back to the oil tank. The height of the second outlet 41 is arranged such that the pressure developed at this outlet is compatible with the pressure in the oil tank as will be explained later.

Turning now to the oil tank 2, compressed air is fed to the tank via a pipe 42 to maintain the tank at a preselected pressure, referred to as the first pressure, and a conduit 43 communicates between the floor of the tank and the second outlet 40 in the separator. The purpose of this is to allow a two way flow of oil between the separator and the tank depending on the pressures at the two ends of the conduit 43. The tank may need to be vented and a vent pipe 44 is provided which passes directly to the inlet of the separator to vent the air overboard. The diameter of the pipe is kept as small as possible to avoid excessive loss of tank pressurisation air. The vent pipe 44 also provides an additional supply of oil to the separator during inverted flight.

In operation the system acts as follows:

The velocity of the oil entering the scoop 38 in conjunction with the centrifugal pressure due to the depth of the separated oil on the radially outer wall of the compartment, generates enough pressure to drive the oil along the supply ducting 40 to the bearing chambers 3. The oil is arranged to pass through the cooler 5 in the supply ducting 40. After lubricating the bearings, the oil is blown back along the scavenge ducting 10 as an air-oil mixture to the separator inlet, where, after doing work on the vanes 22, it gets caught up in the porous material of the separator in the compartment 28. By doing work on the separator to assist in driving it the air loses energy and is cooled thus reducing the heat to oil as well as reducing the energy required to drive the separator. The separated oil is re-circulated to the bearings via the scoop 38 as described above. Any excess oil in the compartment will build up on the outer wall increasing the centrifugal head, and hence the oil pressure, until it submerges the second outlet 41. The radius of this outlet is arranged to be such that when the oil reaches it, the centrifugally generated pressure on the outlet is equal to the first pressure in the oil tank. As the oil depth continues to increase on the outer wall of the compartment, the increasing oil pressure at the second outlet drives the oil into the oil tank.

If for any reason, e.g. aerobatic manoeuvres, less oil returns to the separator than passes out through the scoop 38, the level of oil on the outer wall of compartment 36 will drop and uncover the second outlet, thus allowing the pressurised oil in the oil tank to flow into, and top up, the separator with oil. The system is thus completely self-regulating and fully aerobatic. It will continue to operate even when the tank is empty, provided that there is a scavenge flow from the bearing chambers to the separator inlet.

Depending on the pressure in the oil tank, a higher pressure may be required at the second outlet than can be generated by the centrifugal pressure head alone, so that the second outlet may be in the form of a second scoop to take advantage of some or all of the velocity head available in the rotating oil to increase the pressure.

Various additional refinements may be added to the above-described general system. For example, in the separator, another compartment 50 may be provided which has a radial depth greater than that of the other compartments 28 and 36, and an orifice 51 is provided to allow oil to enter the chamber 50 where any foreign matter can collect for subsequent inspection.

Also, in the bearing chambers, a radially inwardly facing channel 54 may be provided at a small distance from the radially outer wall thereof, and which is connected to rotating structure in the chamber. On start-up in cold conditions, when the air pressure in the bearing chamber may be insufficient to blow the cold viscous oil along the scavenge system, the oil level will build up in the chamber until the oil spills into the rotating channel which will energise the oil by centrifugal action. A static scoop 56 extending into the channel and connected to direct oil straight into the scavenge ducting will thus drive the oil back to the separator. As the oil warms up the pressurisation air will increasingly take over the scavenging function and the oil level will drop until no oil remains in the channel. As an alternative to the static scoop 56 the oil from the channel can be passed through apertures in the base of the channel to a diffusing scroll leading to the scavenge ducting.

I claim:

1. A gas turbine engine oil system comprising an oil storage tank, a rotatable centrifugal separator, bearing chambers of an engine, scavenge means which operatively removes oil from the bearing chambers and directs it to the centrifugal separator, means for pressurizing said tank to a first pressure, conduit means which operatively conveys oil from the interior of said tank to the centrifugal separator oil circulating means which operatively directs at least a portion of the oil from the separator to the engine bearing chambers by centrifugal action of the centrifugal separator without passing the oil through said tank, and where said conduit means also operatively directs oil in excess of that required by the oil circulating means, back to said tank, at a pressure higher than the first pressure, whereby the bearing chambers and the tank are in separate flow circuits with each said circuit having said separator as an element thereof.

2. A gas turbine engine oil system as claimed in claim 1 in which the scavenge means comprises a plurality of scavenge openings in surrounding peripheral walls of each bearing chamber to ensure that oil is removed from the bearing chambers whatever attitude they adopt during operation.

3. A gas turbine engine oil system as claimed in claim 1 in which said conduit, which is connected to a side of said tank and said tank is provided with a vent means at a location on a side of said tank opposite to the side to which said conduit is connected, and said vent means also communicates with the interior of the centrifugal separator.

4. A gas turbine engine oil system as claimed in claim 1 in which the scavenge means comprises a radially inwardly facing annular channel connected to a rotating structure in each bearing chamber and positioned close to an outer wall of the bearing chamber, and means for directing oil collecting in the annular channel to an outlet from the bearing chamber which communicates with the centrifugal separator.

5. A gas turbine engine oil system as claimed in claim 4 in which a static scoop positioned close to the radially outer wall of the channel constitutes the means for directing oil collecting in the channel to the outlet.

6. A gas turbine engine oil system as claimed in claim 1 in which the oil circulating means comprises a static scoop disposed within a cylindrical compartment of the rotatable separator and arranged to collect oil from adjacent a radially outer wall of the compartment.

7. A gas turbine engine oil system as claimed in claim 6 in which the scoop includes a diffuser.

8. A gas turbine engine oil system as claimed in claim 6 in which said static scoop is located adjacent the radial outer wall of the compartment and said conduit means for directing excess oil back to said tank comprises an outlet from the compartment containing the scoop, said outlet being arranged to collect oil from a location adjacent the radially outer wall of the compartment but is located at a position radially inwardly from said scoop.

* * * * *